United States Patent Office 3,578,621
Patented May 11, 1971

3,578,621
DIESTERS EXHIBITING INTERNAL-EXTERNAL LUBRICATING PROPERTIES IN STRUCTURAL RESINS
Christian H. Stapfer, Newtown, Pa., assignor to Carlisle Chemical Works, Inc., Reading, Ohio
No Drawing. Filed Aug. 27, 1968, Ser. No. 755,736
Int. Cl. C08f *45/36;* C08g *51/36*
U.S. Cl. 260—31.6                    10 Claims

---

ABSTRACT OF THE DISCLOSURE

Esters, which have a formula corresponding to $$R-\overset{O}{\overset{\|}{C}}-O-R_1-O-\overset{O}{\overset{\|}{C}}-R \text{ and } R-O-\overset{O}{\overset{\|}{C}}-R_1-\overset{O}{\overset{\|}{C}}-O-R$$

wherein R is an alkyl radical having 15 to 30 straight chain carbon atoms and $R_1$ is an alkylene radical or alkenylene radical having 2 to 12 straight chain carbon atoms, have been found to unexpectedly act as combined internal and external lubricants for structural resins.

---

This invention relates to structural resin compositions having diesters unexpectedly providing internal and external lubrication. More particularly, this invention relates to lubricants having an ester conforming to the following formulas:

$$R-\overset{O}{\overset{\|}{C}}-O-R_1-O-\overset{O}{\overset{\|}{C}}-R \text{ or } R-O-\overset{O}{\overset{\|}{C}}-R_1-\overset{O}{\overset{\|}{C}}-O-R$$

wherein R is an alkyl radical having 15 to 30 straight chain carbon atoms and $R_1$ is an alkylene radical or alkenylene radical having 2 to 12 straight chain carbon atoms.

Lubricants for resin compositions have been, heretofore, separately classified into two categories, i.e., external lubricants and internal lubricants. An external lubricant is a material whose main function is the reduction of friction between the plastic composition and mechanical parts of processing equipment. Materials, which act as external lubricants, are usually those having a low compatibility with the polymer which cause them to remain at the surface of the polymer during processing and thereby act as lubricants between the resin and the equipment.

An internal lubricant has the principal function of reducing internal friction, such as, between clusters of molecules within the resin. In order to act as an internal lubricant, a material must have sufficient compatibility to remain within the polymer and minimize the rate of migration. The compatibility of internal lubricants is usually developed by introducing polar groups into the molecular structure of the lubricant, but once the compatibility has been developed two additional problems must be overcome. First, the lubricant must have a low rate of diffusion through the polymer to prevent excessive migration which among other disagreeable effects causes spewing. Second, is the potency of the lubricant. In order to prevent plasticization of the resin the internal lubricant must be present in small amounts to prevent adverse effects on physical properties required of structural resins.

Conventional lubricants in the art have been separately classified either as an external or an internal lubricant. For example, paraffin waxes and polyamide waxes are used as external lubricants while polyhydric alcohol monoesters and oxidized paraffins are used as internal lubricants.

Some monocarboxylic acids and monohydric alcohols have also been used as internal lubricants. Among these compounds stearic acid and stearic alcohol were once popular internal lubricants, but their use has dwindled because both have high rates of migration which leads to spewing. Paraffin waxes are accepted as imparting good external lubricity, but their incompatibility with structural polymers results in excessive haze or fogging of resin articles. Therefore, the stearamide waxes have gained great popularity as external lubricants, particularly in the vinyl industry, because the clarity of the resins is not drastically impaired. However, the stearamide waxes often produce a substantial reduction in the stabilizing activity of various commercial heat stabilizers.

Esters of polyhydric alcohols and monocarboxylic acids heretofore employed are good internal lubricants providing good early color clarity. However, they generally lack external lubricity, causing poor extrusion rates and most of these esters exhibit high rates of migration to the surface.

It has heretofore been necessary to include both an external lubricant and an internal lubricant when formulating structural resins in order to obtain both internal and external lubrication. This has several disadvantages among which are the problems of: (1) selecting two lubricants which are mutually compatible, (2) the compatibility of each individual lubricant within the stabilizers and (3) interaction of the combined lubricants with the stabilizers.

In addition, fields, which require clarity and transparency, as well as physical properties, further restrict and complicate the selection of proper lubricants. The plastic container industry is an example of a demand for structural resins of this type.

I have discovered that certain esters provide internal and external lubrication of structural resins without substantial impairment of conventional stabilizers. Diesters suitable for practicing the present invention conform to the formulas $$R-\overset{O}{\overset{\|}{C}}-O-R_1-O-\overset{O}{\overset{\|}{C}}-R \text{ and } R-O-\overset{O}{\overset{\|}{C}}-R_1-\overset{O}{\overset{\|}{C}}-O-R$$

wherein R is an alkyl radical having 15 to 30 straight chain carbon atoms and $R_1$ is an alkylene radical or alkenylene radical having 2 to 12 straight chain carbon atoms.

Diesters which may be used in practicing the present invention are those prepared by reacting monocarboxylic acids having 16 to 30 straight carbon atoms with dihydric alcohols having 2 to 12 carbon atoms or dicarboxylic acids having 2 to 12 carbon atoms and monohydric alcohols having 16 to 30 carbon atoms. Methods suitable for preparing these esters are well known and esters having an acid value of 0 to 40 are suitable, although esters with an acid value of 0 to 15 are preferred.

Suitable monocarboxylic acids include straight and branched chain acids such as stearic acid, 10-methyl octadecanoic acid, nonadecanoic acid, palmitic acid, margaric acid, arachidic acid, heneicosanoic acid, behenic acid, tricosanoic acid, lignoceric (carnaubic) acid, pentacosanoic acid, hexacosanoic acid, carboceric acid, octacosanoic acid, montanic acid and triacontanoic acid.

Dicarboxylic acids which are suitable in practicing the present invention are straight chain acids, such as: oxalic acid, malonic acid, succinic acid, glutaric acid, adipic acid, pimelic acid, suberic acid, maleic acid, fumaric acid, azelaic acid, sebacic acid, dodecanedioic acid and branched chain acids, such as: 2,2-dimethyl pentanedioic acid, 3,3-dimethyl pentanedioic acid, 2-ethyl-3-methyl pentanedioic acid, 2-ethyl-4-methyl pentanedioic acid and 3-ethyl-3-methyl pentanedioic acid.

Examples of monohydric alcohols suitable for practicing the present invention are stearyl alcohol, cetyl alcohol, 1-nonadecanol, caryanbyl alcohol, ceryl alcohol, montanyl alcohol, ginnol or 10-monacosanol and melissyl alcohol.

Examples of dihydric alcohols suitable for practicing the present invention are ethylene glycol, 1,2-propanediol, 1,3-propanediol, 1,6-hexanediol, 1,3-hexanediol, 2-ethyl- 1,3-hexanediol, 2,3-hexanediol, 2,5-hexanediol, 1,8-octanediol and 4,5-octanediol.

The amount of internal-external lubricant generally used is 0.1 to 5.0 percent by weight of the resin and 0.5 to 2 percent by weight is preferred. These lubricants can be incorporated into the resin by any conventional means, such as, blending with the resin on a roll mill. They are usually incorporated along with other ingredients, such as, stabilizer pigments and the like, although this is not necessary.

Resins commonly used to manufacture structural articles which have been found to be both internally and externally lubricated by the diesters of the persent invention include polyvinyl chloride, polyvinylidene chloride, polycant. The polymer was milled on a two-roll mill for five minutes at 320° F. and then each sample was baked in an oven at 400° F. and the time until discoloration observed as well as the time until decomposition occurred. In Table I, $T_1$ represents the time in minutes until discoloration of the sample and $T_2$ represents the time for decomposition. A and B identify lubricants of the present invention, i.e., 2-ethyl hexanediol-1,3-distearate, having an acid number of 20, and distearyl sebacate, having an acid number of 9, respectively. Samples C and D are comparative tests conducted with ethylene bisstearamide and paraffin wax, respectively. "Clarity" represents the appearance of the plastic as determined by visual observation prior to discoloration.

TABLE I

| | | Lubricant | | | | | | | | | | | |
|---|---|---|---|---|---|---|---|---|---|---|---|---|---|
| | | A | | | B | | | C | | | D | | |
| Polymer | Stabilizer | Clarity | $T_1$ | $T_2$ | Clarity | $T_1$ | $T_2$ | Clarity | $T_1$ | $T_2$ | Clarity | $T_1$ | $T_2$ |
| Example Number: | | | | | | | | | | | | | |
| 1 ... PVC | Dibutyltin bis isooctylthioglycolate | Clear | 20 | 45 | Clear | 20 | 35 | Hazy | 20 | 30 | Opaque | 20 | 45 |
| 2 ... PVC | Dibutyltin B mercapto propionate | do | 45 | 60 | do | 30 | 35 | do | 30 | 45 | do | 30 | 60 |
| 3 ... PVC | Dibutyltin bis isooctyl maleate | do | 20 | 45 | do | 25 | 30 | Clear | 25 | 30 | do | 25 | 35 |
| 4 ... PVC | Dibutyltin maleate | do | 20 | 45 | do | 25 | 35 | Hazy | 25 | 35 | do | 25 | 30 |
| 5 ... PVC | Advastab BC-12 [1] | Hazy | 10 | 35 | do | 10 | 30 | do | 10 | 25 | do | 10 | 30 |
| 6 ... PVC | Advastab BC-100S [2] | do | 0 | 25 | do | 10 | 20 | do | 0 | 25 | do | 0 | 25 |
| 7 ... PVC | Advastab CZ-18 [3] | Opaque | 0 | 20 | do | 5 | 15 | Opaque | 0 | 25 | do | 0 | 25 |
| 8 ... PVC | Advastab 765-134 [4] | do | 0 | 20 | do | 5 | 15 | do | 0 | 20 | do | 0 | 25 |

[1] A commercial solid barium-calcium stabilizer manufactured by Carlisle Chemical Works, Inc.
[2] A commercial liquid barium-calcium stabilizer manufactured by Carlisle Chemical Works, Inc.
[3] A commercial solid calcium-zinc stabilizer manufactured by Carlisle Chemical Works, Inc.
[4] A commercial liquid calcium-zinc stabilizer manufactured by Carlisle Chemical Works, Inc.

acrylonitrile, polybutadiene, polystyrene, polyesters, polyolefins, epoxy resins, nitrocellulose resins, ABS copolymers and the various copolymers of vinylchloride, vinyl acetate, vinylidene chloride, styrene, acrylonitrile, butadiene and the like.

The diesters of the present invention have been found particularly desirable, in addition to their combined internal-external lubricity, because they impart remarkable clarity and early color while maintaining their lubricating properties and do not adversely affect any of a large number of common heat stabilizers which may be present. In addition, they exhibit very low rates of migration thereby reducing the spewing problems heretofore encountered with conventional internal lubricants.

The following examples are presented to demonstrate the internal-external lubricity of the novel lubricants of the present invention. In the following examples temperature values are degrees F., time is in minutes and both parts and percentages are by weight.

EXAMPLES 1–8

These examples are presented to demonstrate the compatibility of the lubricants of the present invention with several conventional stabilizers while retaining their unexpected internal-external lubricating properties.

In each example four tests were made as a comparison. Each test was conducted by mixing 100 parts of a polyvinyl chloride resin (Geon 103 EP manufactured by B.F. Goodrich Co.) with two (2) parts of the respective stabilizer as indicated in Table I and one (1) part of a lubri-

EXAMPLE 9

Formulations, containing 100 parts polyvinyl chloride resin, 3 parts of an acrylic processing aid and 0.5 part of the indicated lubricant in each formulation, were stabilized with 2.0 parts of dibutyltin bis isooctyl thioglycolate. Part of each formulation was processed in a torque rheometer at 190° C./140 r.p.m. and the respective time for decomposition was observed. Another part of each formulation was extruded on a 1 inch MPM laboratory extruder and the respective output rates were recorded as well as observations of the color and clarity of the extrude. Of the remainder of each formulation, a portion was post-extrusion press-polished and stress-whitening of the other portion was conducted. The results are summarized in the following table:

TABLE II

| Lubricant | Time for decomposition | Color | Clarity | Rate in lbs./hour | Press polish | Stress whitening |
|---|---|---|---|---|---|---|
| 2-ethylhexane diol 1,3-distearate | 13.3 | Excellent | Excellent | 10.8 | Clear | None. |
| Distearylazelate | 12.6 | do | do | 10.8 | do | Do. |
| Distearylsebacate | 13.5 | do | do | 10.4 | do | Do. |
| Glycerol monostearate [1] | 12.7 | Good | Good-excellent | 10.2 | Slightly yellow | Do. |
| Ethylene distearamide [1] | 11.3 | do | Good | 10.9 | Yellow | Slight. |
| Paraffin wax: | | | | | | |
| Aristowax 165 [1] | 10.1 | Opaque | None | 10.5 | Opaque | Severe. |
| Hoechst Wax E [1] | 12.4 | Cloudy | do | 10.7 | Cloudy | Do. |

[1] Comparative test—not example of the invention.

EXAMPLE 10

Four formulations of 100 phr. of Kralastic 2540, a general purpose prestabilized acrylonitrile-butadiene styrene copolymer resin manufactured by Uniroyal, Inc., were each lubricated with 1.0 phr. of one of the lubricants evaluated in Example 1. After milling and baking under conditions similar to those of Examples 1–8, the following results were obtained.

TABLE III

| | $T_1$ | $T_2$ | Remarks |
|---|---|---|---|
| A | 40 | 90 | Very good early color. |
| B | 40 | 90 | Good early color. |
| C | 30 | 70 | Poor early color. |
| D | 40 | 70 | Do. |

EXAMPLE 11

Formulations, each containing 100 parts polyvinyl chloride resin and 0.5 part of the indicated lubricant, were tested for lubricating qualities by charging Brabender Plastograph torque rheometer (manufactured by the Brabender Corporation) operated at 150° C. and 40 r.p.m. with 60 g. of a formulation and determining the time to flux in minutes and the preflux torque just before fusion in meter-grams. A long time to flux demonstrates good external lubrication, while the shorter times indicate poor external lubrication. The preflux torque values demonstrate good internal lubrication when the value is relatively high and poorer internal lubrication when the value is low. The values obtained are reported in the following table and demonstrate that the diesters of the present invention exhibit both internal and external lubricating properties while the convention lubricants exhibit only one or the other.

TABLE IV

| Lubricant | Time to flux (minutes) | Preflux torque (meter-grams) |
|---|---|---|
| 2 ethyl hexanediol 1,3-distearate | 16.4 | 1,100 |
| Distearyl azelate | 13.1 | 1,200 |
| Glycerol monostearate [1] | 8.4 | 1,400 |
| Paraffin [1] | >30 | 500 |
| Montan wax ester [1] | >30 | 500 |

[1] Comparative test—not example of the invention.

EXAMPLE 12

Four formulatios, each containing 100 parts of a polyvinyl chloride resin and 0.5 part of the indicated lubricant, were tested to demonstrate the improved results obtained by use of the low acid value esters in comparison with esters of a high acid value. Each formulation was tested by the method of Example 11 and the results are reported below.

TABLE V

| Lubricant | Acid value | Time to flux (minutes) | Preflux torque (meter-grams) |
|---|---|---|---|
| Distearyl sebacate | 100 | 12.1 | 1,100 |
|  | [1] 36 | 22.7 | 1,000 |
| Distearyl maleate | 100 | 13.5 | 1,050 |
|  | [1] 36 | 20 | 900 |

[1] Comparative test—not example of the invention.

EXAMPLE 13

Seven formulations, each containing 100 parts polyvinyl chloride, 1.5 parts dibutyl tin bis isooctylthioglycolate stabilizer and 1 part of the indicated lubricant were tested to demonstrate that when R is less than 15 straight carbons the system does not exhibit the desired properties. A portion of each formulation was tested on the plastigraph as described in Example 11 and the remaining portion was tested on a two-roll mill at 360° F. to determine the time until sticking occurs as a measure of system lubricity and the longer time to sticking indicates better external lubrication. The results are reported to the following table.

TABLE VI

| Lubricant | Time to flux (minutes) | Post fusion torque (meter-grams) | Sticking time | Number of carbons on the R chain |
|---|---|---|---|---|
| Octylene glycol distearate | 4.5 | 1,650 | 14 | 18 |
| Distearyl sebacate | 3.0 | 1,700 | 12 | 18 |
| Ethylene glycol dilaurate [1] | 2.1 | 1,895 | 10 | 12 |
| Dilauryl azelate [1] | 1.65 | 1,890 | 8 | 12 |
| Ethylene glycol di 2-ethyl hexoate [1] | 1.8 | 1,890 | 8 | 8 |
| Diisooctyl sebacate [1] | 1.6 | 1,950 |  | 8 |
| Octylene glycol dicaprylate [1] | 1.8 | 1,910 | 8 | 8 |

[1] Comparative test—not example of the invention.

The internal lubricating properties of the lubricant increased as the R chain decreased in length but the undesirable tendency to plasticize the formulation increased along with the reduction in external lubrication.

I claim:

1. A structural vinyl chloride resin composition having 0.1 to 5.0 weight percent of an internal-external lubricant consisting of an ester having a formula selected from the group consisting of

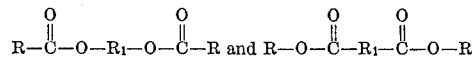

wherein R is an alkyl radical having 15 to 30 straight chain carbon atoms and $R_1$ is selected from this group consisting of alkylene radicals and alkenylene radicals having 2 to 12 straight chain carbon atoms and said ester having an acid value of 0 to 40.

2. The composition of claim 1 wherein R has 17 carbon atoms and $R_1$ has 6 to 10 carbon atoms.

3. The composition of claim 2 wherein the resin is a rigid polyvinyl chloride.

4. The composition of claim 2 wherein R has at least one alkyl branch radical attached thereto selected from the group consisting of methyl and ethyl radicals.

5. The composition of claim 2 wherein $R_1$ has at least one alkyl branch radical attached thereto selected from the group consisting of methyl and ethyl radicals.

6. The composition of claim 3 wherein the ester is ethylene glycol distearate.

7. The composition of claim 3 wherein the ester is 2-ethyl hexane 1,3-diol distearate.

8. The composition of claim 3 wherein the ester is distearyl azelate.

9. The composition of claim 3 wherein the ester is distearyl sebacate.

10. The composition of claim 3 wherein the ester is distearyl maleate.

References Cited

UNITED STATES PATENTS

| | | | |
|---|---|---|---|
| 2,628,249 | 2/1953 | Bruno | 260—475 |
| 2,838,464 | 6/1958 | Moffett et al. | 260—16 |
| 2,940,949 | 6/1960 | Mullin | 260—31.4 |
| 3,055,297 | 9/1962 | Leeds | 101—327 |
| 3,189,574 | 6/1965 | Rogers et al. | 260—31.8 |
| 3,345,447 | 10/1967 | Grant | 260—31.8 |

DONALD E. CZAJA, Primary Examiner

R. W. GRIFFIN, Assistant Examiner

U.S. Cl. X.R.

260—31.8R, 31.8AN, 31.8DR, 31.8XA, 31.8PQ, 31.8E